Patented Dec. 28, 1943

2,337,714

UNITED STATES PATENT OFFICE 2,337,714

WELDING ROD OR ELECTRODE

Georg Haim and Eric John Rogers, London, England, assignors to Arc Manufacturing Company Limited, London, England, a British company No Drawing. Application November 23, 1942, Serial No. 466,662. In Great Britain December 24, 1941

1 Claim. (Cl. 219—8)

This invention is for improvements in or relating to welding rods or electrodes made of nonferrous metals with particular reference to aluminium and its alloys.

In the welding of aluminium and its alloys it has been customary to employ welding rods or electrodes coated with flux, the object of the flux being to ensure that no aluminium oxide may remain in the metallic deposit. The flux besides dissolving the aluminium oxide reduces sputtering and in the case of an arc-welding process has also a stabilising effect on the arc.

Welded deposits of aluminium and of aluminium alloys are known to be porous and it is an object of the present invention to provide electrodes or welding rods of aluminium or light alloys which lead to the production of dense, nonporous welds.

It has been found that the porosity of an aluminium or light alloy weld is due to moisture adsorbed on the metallic surfaces to be welded and an improvement in the density of the weld is obtained when the surfaces of the metal to be welded are preheated to a temperature high enough to remove the adsorbed moisture. Even after such a preheating treatment a considerable degree of porosity remains and we have now found that this porosity is, at least to some extent, due to moisture contained in the coating of flux on the welding rod or electrode. Welding rods or electrodes may be coated with flux by dipping them into an aqueous suspension of the flux materials or by applying to them a paste or dough of the flux materials, the coated rod or electrode being dried at a temperature up to for example 250° C. in order to remove the bulk of the moisture.

We have now found that the porosity of aluminium or light alloy welds may be greatly reduced by the employment of electrodes or welding rods coated with molten flux.

According to the present invention there is provided a process for preparing a coated welding rod or electrode of non-ferrous metal e. g. of aluminium or of its alloys which comprises applying the flux to the surfaces of the rod or electrode in the molten state. Thus, the rod may be dipped into a bath of the molten flux maintained at a temperature not less than 450° C. and the rod removed.

The composition of the flux may be the same as or similar to that of the solid constituents employed for coating non-ferrous metal e. g. of aluminium or aluminium alloy welding rods or electrodes by processes previously proposed.

The coating which is in the form of a glaze adheres firmly to the surface of the electrode or rod and on storage does not take up sufficient moisture appreciably to affect the porosity of the weld.

It will be understood that the precise temperature at which the molten flux is maintained and the conditions under which it is applied will depend upon the composition of the flux and upon the dimensions and composition of the welding rod or electrode.

Rods or electrodes coated in accordance with the present invention have been found to weld more readily and to give reduced sputtering with minimum amount of fume. In the case of electrodes the arc is more easily maintained and there is a reduction in current consumption. Further, the slag is easier to remove by chipping and deep penetration of the welded deposit into the parent metal takes place.

It has previously been proposed to use electrodes or welding rods for example for the welding of iron or steel or alloys thereof coated with flux applied by dipping into a molten bath of the flux but it has not been proposed to weld nonferrous metals with the use of rods or electrodes coated with flux applied thereto in the molten form.

Following is a description by way of example of one embodiment of the present invention.

Example

A flux mixture is prepared by mixing together powdered components consisting of 30% sodium chloride, 30% potassium chloride, 15% lithium fluoride and 25% cryolite.

The powdered mixture was heated in a salt bath to a temperature of about 610° C., i. e. a temperature above the melting point of the flux but below the melting point of aluminium.

Rods or wires of aluminium are dipped into the molten flux and withdrawn at such a rate as to produce on each a coating of substantially uniform thickness. The molten flux solidifies on the rod to form a firmly adherent glaze.

We claim:

A process for preparing a coated aluminium welding rod which comprises preparing a powdered flux mixture consisting essentially of 30% sodium chloride, 30% potassium chloride, 15% lithium fluoride and 25% cryolite, melting the powdered flux and maintaining it at a temperature below the melting point of aluminium, dipping a rod of aluminium into the molten flux and withdrawing it at such a rate as to produce on it a coating of solidified flux of substantially uniform thickness.

GEORG HAIM.
ERIC JOHN ROGERS.